United States Patent
Cinoman et al.

(10) Patent No.: US 7,638,201 B2
(45) Date of Patent: Dec. 29, 2009

(54) ACID FUNCTIONAL PHOSPHORUS-CONTAINING POLYESTER POWDER COMPOSITIONS AND POWDER COATINGS MADE THEREFROM

(75) Inventors: Douglas S. Cinoman, Douglassville, PA (US); Andrew T. Daly, Sinking Spring, PA (US); Gordon L. Tullos, Reading, PA (US)

(73) Assignee: Rohm and Haas Company, Philadelphia, PA (US)

( * ) Notice: Subject to any disclaimer, the term of this patent is extended or adjusted under 35 U.S.C. 154(b) by 266 days.

(21) Appl. No.: 11/799,618

(22) Filed: May 2, 2007

(65) Prior Publication Data

US 2007/0260003 A1    Nov. 8, 2007

Related U.S. Application Data

(60) Provisional application No. 60/797,883, filed on May 5, 2006.

(51) Int. Cl.
*C08G 63/692* (2006.01)
(52) U.S. Cl. .................. 428/458; 525/167; 525/437; 524/500; 524/904; 428/480
(58) Field of Classification Search .................. 525/167; 528/287
See application file for complete search history.

(56) References Cited

U.S. PATENT DOCUMENTS

| | | | |
|---|---|---|---|
| 4,450,257 A * | 5/1984 | Behmel et al. ............... 525/437 |
| 5,130,463 A | 7/1992 | Haubennestel et al. | |
| 5,859,154 A | 1/1999 | Temple et al. | |
| 6,159,549 A | 12/2000 | Sundararaman et al. | |
| 6,534,178 B2 * | 3/2003 | Zhou et al. ................... 428/413 |
| 6,998,462 B2 | 2/2006 | Duan et al. | |
| 2003/0194554 A1 * | 10/2003 | Petersen et al. ............. 428/402 |
| 2005/0250877 A1 | 11/2005 | Taylor et al. | |

FOREIGN PATENT DOCUMENTS

| | | | |
|---|---|---|---|
| EP | 0 600 546 A1 | | 6/1994 |
| EP | 03425781 .6 | * | 5/2003 |
| EP | 1 383 595 B1 | | 6/2005 |
| EP | 1 593 716 A2 | | 11/2005 |
| JP | 57-87471 | | 5/1982 |
| WO | WO 02/072664 | * | 9/2002 |
| WO | WO 02/072664 A | | 9/2002 |
| WO | WO 02/072664 A1 | | 9/2002 |
| WO | WO 2006/025738 A1 | | 3/2006 |

* cited by examiner

*Primary Examiner*—David Wu
*Assistant Examiner*—Robert Jones, Jr.
(74) *Attorney, Agent, or Firm*—Andrew E. C. Merriam

(57) ABSTRACT

The present invention provides storage stable powder compositions comprising one or more carboxylic acid or anhydride functional, phosphorus-containing polyester chosen from aromatic polyesters having an acid number of 15 or higher mg KOH/g polyester, aliphatic polyesters having an acid number of 20 or higher mg KOH/g polyester. The acid functional, phosphorus-containing polyester comprises the reaction product of one or more polyacid, one or more phosphorus-containing acid or salt thereof and one or more polyol. Preferably, the one or more polyol reactant contains no β-hydrogen such as, for example, neopentyl glycol (NPG). The acid functional, phosphorus-containing polyester may comprise all or part of a binder powder composition, such as a coating powder, or it may comprise an additive thereto that imparts improved pigment wetting and corrosion resistance to a binder composition.

11 Claims, No Drawings

ACID FUNCTIONAL PHOSPHORUS-CONTAINING POLYESTER POWDER COMPOSITIONS AND POWDER COATINGS MADE THEREFROM

This application claims the benefit of priority under 35 U.S.C. §119(e) of U.S. Provisional Patent Application No. 60/797,883 filed on May 5, 2006.

The present invention relates to powder compositions comprising acid functional, phosphorus-containing polyesters for use in coating powders. More particularly, it relates to powder compositions comprising acid functional, phosphorus-containing aromatic polyesters having an acid number of 15 or higher mg KOH/g polyester and/or acid functional, phosphorus-containing aliphatic polyesters having an acid number of 20 or higher mg KOH/g polyester, to processes of making them, and to the corrosion resistant powder coatings made therefrom.

Powder coatings have been used in a number of applications over various metal substrates, including architectural coatings over aluminum and coatings used in the agricultural, construction and appliance industry over steel. Each of these applications demands excellent coating adhesion, corrosion resistance to protect the substrate, pigment wetting and weatherability. In other powder coating applications, for example coatings containing bonded metallic flake pigments the coatings contain corrosable materials and demand excellent corrosion resistance in the coating as well as excellent pigment wetting and coating adhesion.

Previously, corrosion resistance and adhesion to metal has been imparted to coatings largely through the use of additives, such as metal phosphates, zinc, or organic anti-corrosives, or through the use of corrosion resistant primers including chromium compounds and metal phosphates. However, additives for corrosion resistance have proven costly and can pose disposal problems and potential environmental hazards. Still further, corrosion resistant primers and/or overcoats are costly and often require integration of two coating materials from two or more suppliers to fashion a solution, especially in the case of powder coatings.

In light of the environmental concerns posed by corrosion pretreatments, especially metal phosphates and chromium containing pretreatments, coating corrosion pretreatments have recently evolved toward environmentally friendly dry-in place pretreatments and away from phosphate and chromium containing pretreatments. However, the new dry-in place pretreatments may not work as well as the older liquid pretreatments and coating adhesion to metal substrates suffers, especially adhesion to the inexpensive and lower quality metal substrates that are increasingly used in and exported by emerging markets.

Seeking to improve on powder coating adhesion to metal substrates DSM N.V. discloses, in World Intellectual Property Organization Published Application WO 02/072664 A1, coating compositions comprising phosphatized polyesters, including coating powder compositions, the phosphatized polyester comprising a phosphatized aromatic polyester having an acid number of below 10 mg KOH/g polyester, or comprising a phosphatized aliphatic polyester originating from only aliphatic monomers and having an acid number below 20 mg KOH/g polyester. According to WO 02/072664 A1, phosphatized polyesters having acid numbers ranging above the limits recited in WO 02/072664 A1 are expected to be unstable and, thus, would be expected to provide unstable coating compositions. Thus, coatings comprising the phosphatized polyesters of WO 02/072664 A1 allegedly exhibit good corrosion resistance and adhesion to metal substrates. However, according to WO 02/072664 A1, the hydroxyl number of the phosphatized polyesters provided thereby is not critical. In fact, polyesters having hydroxyl numbers above about 25 mg KOH/g polyester would provide coatings having inadequate to poor weatherability.

The present inventors seek to solve the problem of providing shelf stable powder compositions that provide corrosion resistant powder coatings and films having excellent coating adhesion, and acceptable weatherability while avoiding costly or hazardous anti-corrosion additives or pretreatments.

STATEMENT OF THE INVENTION

The present invention provides powder compositions comprising one or more acid functional, phosphorus-containing polyester chosen from an acid functional, phosphorus-containing aromatic polyester having an acid number of 15 or higher mg KOH/g polyester and up to 100 mg KOH/g polyester, an acid functional phosphorus-containing aliphatic polyesters having an acid number of 20 or higher mg KOH/g polyester and up to 100 mg KOH/g polyester, and mixtures and combinations thereof. The acid functional, phosphorus-containing polyester of the present invention comprises the reaction product of one or more polyacid, one or more phosphorus containing acid or salt thereof and one or more polyol. Preferably, the polyol is chosen from a polyol that contains no β-hydrogen, such as, for example, neopentyl glycol (NPG). In addition, the present invention provides methods for making acid functional, phosphorous-containing polyesters. Further, the present invention provides corrosion resistant powder coatings and films made from the compositions of the present invention, such as coatings on metal substrates and the coated substrates. Suitable metal substrates may comprise steel, aluminum, pretreated steel, and pretreated aluminum, such as, for example, steel or aluminum that has been pretreated with dry-in place pretreatments.

The powder compositions of the present invention may further comprise one or more resin or (co)polymer chosen from polyester, epoxy, acrylic, poly(glycidyl(meth)acrylate), urethane, silicone, hybrids thereof, and mixtures thereof. The one or more resin(s) or (co)polymer provide a binder which can further comprise the acid functional, phosphorous-containing polyester of the present invention. The binder may not include one or more acid functional, phosphorus-containing polyester; in such cases, the acid functional, phosphorus-containing polyester of the present invention is added to the composition in the amount of up to 20 phr, or up to 10 phr to impart corrosion resistance and/or adhesion to substrates.

Preferably, powder compositions comprise phosphorus-containing polyesters having with an acid number of from 20 to 60 mg KOH/g polyester and one or more curing agent. Preferred curing agents may comprise one or more hydroxyalkylamide (HAA), such as a β-hydroxyalkylamide, bisphenol based epoxy resin or polyamine adduct thereof, or triglycidyl isocyanurate (TGIC).

The compositions may further comprise one or more pigments or colorants, for example, a metallic flake pigment such as aluminum flake, also called aluminum bronze.

The present inventors have discovered that the acid functional, phosphorus-containing polyester of the present invention provide storage stable powders. In addition, powders comprising the acid functional, phosphorus-containing polyester of the present invention provide coatings and films having good corrosion resistance and adhesion to metal, especially poorly cleaned metal substrates or metal substrates having a low quality or a minimal pretreatment. In addition, the acid functional, phosphorus-containing polyester of the present invention provides coatings or films having good weatherability properties. Accordingly, the acid functional, phosphorus-containing polyester powders of the present invention enable the provision of coatings or films suitable for use on heavy equipment for construction or agriculture, and on steel or aluminum building materials, such as extruded aluminum window frames.

Powders based on the acid functional, phosphorus-containing polyesters of the present invention provide good pigment wetting and pigment dispersion properties, especially in applications using flake pigments. Accordingly, the powders of the present invention may enable higher pigment loading more efficient pigment hiding in coatings and films in comparison to the same coatings or films without acid functional, phosphorus-containing polyesters. Therefore, the powders of the present invention can enable the provision of thin film coatings that are no more than 75 µm thick, or, preferably no more than 50 µm thick, or, more preferably, no more than 40 µm thick.

All phrases comprising parenthesis denote either or both of the included parenthetical matter and its absence. For example, the phrase "(co)polymer" includes, in the alternative, polymer, copolymer and mixtures thereof and the term "(meth)acrylic" means acrylic, methacrylic, and mixtures thereof.

Unless otherwise noted, all processes refer to and all examples were performed under conditions of standard temperature and pressure (STP).

All ranges cited herein are inclusive and combinable. For example, if an ingredient may be present in amounts of 4 wt. % or more, or 10 wt. % or more, and in amounts up to 25 wt. %, then that ingredient may be present in amounts of 4 to 10 wt. %, 4 to 25 wt. % or 10 to 25 wt. %.

As used herein, unless otherwise indicated, the term "acid number" shall mean the quantity determined by the following equation:

$$AN = \text{(Number equivalents excess acid used to make the polymer)} \times (56.1 \text{ g/eq. KOH}) \times (1000 \text{ mg KOH/g KOH}) / \text{(Number of grams polymer)}$$

wherein the acid equivalents are the total of carboxylic and phosphorus containing acid equivalents present, further wherein it is assumed that only two acidic groups on any phosphorus containing acid have the potential to react and become chemically incorporated into the resin, so that for the purpose of calculating acid equivalents, the equivalent weight of any phosphorus containing acid is half of its molecular weight, and, still further wherein, the number of grams polymer is the mass of the product given after adjusting for water loss in condensation, i.e. by subtracting the mass of water equal to the number of equivalents of polyol present in the overall reaction. Polyol that is lost during reaction and replenished is not counted toward the number of equivalents of polyol used to make the resulting polymer.

As used herein, the term "aliphatic polyester" shall mean any polyester made from only aliphatic monomers, e.g. adipic acid and NPG.

As used herein, the term "aromatic polyester" shall mean a polyester made from at least one aromatic monomer, e.g. isophthalic acid (IPA).

As used herein, the term "average particle size" shall mean, unless otherwise indicated, the particle diameter or the largest dimension of a particle in a distribution of particles as determined by laser light scattering using a Malvern Mastersizer™ 2000 instrument (Malvern Instruments Inc., Southboro, Mass.) per manufacturer's recommended procedures.

As used herein, the phrase "coating powder" refers to a powder coating composition and the phrase "powder coating" refers to a coating formed from a powder coating composition.

As used herein, the term "copolymer" shall mean any polymer made from two or more different monomers. For example, each of polyester made from a dicarboxylic acid, a diol and phosphoric acid and a polyester made from a dicarboxylic acid and a diol is a copolymer.

As used herein, the term "hybrid" of any (co)polymer or resin shall refer to adducts, grafts or block copolymers and compatible or compatibilized blends of such (co)polymers or resins, such as epoxy polyester hybrids.

As used herein, unless otherwise indicated, the term "glass transition temperature" or "$T_g$" of any resin or (co)polymer is measured using differential scanning calorimetry (DSC) (rate of heating of 20° C. per minute), the $T_g$ being taken at the midpoint of the inflection. $T_g$ may alternatively be calculated as described by Fox in *Bull. Amer. Physics. Soc.*, 1, 3, page 123 (1956).

As used herein, unless otherwise indicated, the term "hydroxyl number" means the quantity as determined by titration in phenolphthalein.

As used herein, unless otherwise indicated, the term "molecular weight" refers to the weight average molecular weight of a polymer as measured by gel permeation chromatography (GPC) calibrated with polystyrene standards.

As used herein, the term "hydroxyl number" means the number of mg KOH per gram polyester As used herein, unless otherwise indicated, the phrase "per hundred parts resin" or "phr" means the amount, by weight, of an ingredient per hundred parts, by weight, based on the total amount of resin, reactant monomer, and (co)polymer contained in a composition, including cross-linking agents, curing agents and any reactive additive, such as an acid functional, phosphorus-containing polyester.

As used herein, the term "polyacid" means any organic compound having two or more carboxylic acid groups or its anhydride, such as, for example, dicarboxylic acids.

As used herein, the term "polyol" means any organic compound having two or more hydroxyl or active hydrogen groups, such as, for example, diols and triols.

As used herein, the term "polymer" includes polymers that are the reaction product of any number of different monomers, such as terpolymers, and tetra polymers, and, further, includes random, block, segmented and graft copolymers, and any mixture or combination thereof.

As used herein, the term "product" refers to coatings, films, multilayer articles, coated substrates and capstocks.

As used herein, the terms "resin" and "polymer" are interchangeable.

As used herein, the term "wt. %" refers to weight %.

The acid functional, phosphorus-containing polyester of the present invention contains one or more chemically bound phosphorus containing acid. Suitable acid functional, phosphorous-containing polyesters of the present invention may have a weight average molecular weight of from 500 to 15,000. Preferably, to provide more storage stable powders, the acid functional, phosphorous-containing polyester has a weight average molecular weight of 1000 or more, and, more preferably, for use as a sole binder, 2000 or more. For improved pigment wetting and product adhesion to a substrate, the acid functional, phosphorous-containing polyester the present invention may have a weight average molecular weight of 10,000 or less, or 6,000 or less.

Suitable $T_g$s for useful acid functional, phosphorous-containing polyesters can range from 30° C. or higher, and may range up to 130° C., preferably up to 80° C.

The acid number of any suitable acid functional, phosphorus-containing polyester ranges up to 100 mg KOH/g polyester, or up to 70 mg KOH/g polyester, and preferably up to 60 mg KOH/g polyester. Preferably, the acid number ranges 30 or higher mg KOH/g polyester.

Suitable polyols include, for example, one or more $C_2$ to $C_{24}$ linear or branched diol. Preferably, the polyol does not have any β-hydrogen (hydrogen beta to a hydroxyl group) because polyols having β-hydrogen can lose water to form an alkene by-product and water. Preferred diols include branched diols, such as, for example, neopentyl glycol (NPG) and 2-butyl, 2-ethyl, 1,3-propane diol (BEPD).

Suitable polyacids include, for example, di- or higher functional carboxylic acids and their anhydrides, such as, for example, succinic acid, glutaric acid, adipic acid, pimelic acid, azelaic acid, sebacic acid, 1,12-dodecanedioic acid, hexahydrophthalic acid, tetrahydrophthalic acid, hexahydroisophthalic acid, and methylhexahydrophthalic acid, terephthalic acid, isophthalic acid (IPA), phthalic acid, 1,4-cyclohexanedicarboxylic acid, 1,3-cyclohexanedicarboxylic acid, naphthalene dicarboxylic acid, trimellitic acid, trimesic acid, pyromellitic acid and anhydrides thereof. Preferred polyacids may include IPA, phthalic acid, and mixtures thereof with one or more other polyacid. Phthalic acid may provide polyesters having relatively high weatherability and tensile strength properties.

Suitable phosphorus containing acids include, for example, phosphoric acid, phosphorus acid, phosphinic acid, phosphinous acid, polyphosphoric acid, orthophosphoric acid, metaphosphoric acid, organic acid phosphate, phosphorus oxychloride, alkyl esters of phosphoric acid, anhydrides of phosphoric acid, hydrogen containing salts of phosphoric acid, hydrogen containing salts of hypo-phosphorus acid, hydrogen containing salts of phosphorus acid, hydrogen containing salts of orthophosphoric acid, hydrogen containing salts of polyphosphoric acid, hydrogen containing salts of metaphosphoric acid, and mixtures thereof. Preferably, the phosphorus containing acid may be chosen from orthophosphoric, polyphosphoric acid, metaphosphoric acid, salts thereof, mixtures thereof, and mixtures thereof with other phosphorus containing acids.

The acid functional, phosphorus-containing polyester of the present invention may be made in bulk by condensing one or more polyol with an excess of acid, taken on an equivalent basis, comprising one or more phosphorus containing acid or salt thereof and one or more polyacid. Suitable amounts of the phosphorus containing acid, as reactant, may range from 0.1 to 10 wt. %, preferably, from 0.5 to 3 wt. %, and, more preferably, up to 1.5 wt. %, all weight percentages based on the total weight of all reactants used to make the acid functional, phosphorous-containing polyester. To determine how much acid is "excess acid", any polyol that is lost during reaction via distillation or by-product formation is not counted toward either the number of equivalents of polyol that is added to the reaction mixture or that is contained in the resulting polymer, such as for the purpose of calculating acid number. Accordingly, from time to time throughout the reaction, additional polyol(s) may be added to the reaction to replenish lost polyol.

To insure a carboxylic acid functional polyester product, excess polyacid may be added, for example, in the last step of reaction such as in carboxylic endcapping the polymer, or polyacid may be added in one or more stage, feed or shot to the reaction mixture so that unreacted polyacid is present after all of the polyol has been consumed. Preferably, polyacid is added to the ongoing reaction when the acid number drops below 15, or, preferably, when the acid number drops below 30, for example, 2 hours after completely adding reactants that would give a polyester having an acid number of below the desired acid number limit, e.g. 15 or 30.

In addition, the carboxyl functionality of the acid functional, phosphorus-containing polyesters may be increased so as to reduce the amount of cyclic ether by-product formation from free polyols, thereby yielding products having improved physical properties, such as impact resistance and solvent resistance.

The condensation polymerization reaction may be conducted at a temperature of from 100 to 450° C., preferably, 250° C. or less, more preferably, from 150° C. to 220° C. The polymerization reaction temperature may be limited so that the phosphorus containing acid does not hydrolyze the forming polyester. Further, the reaction temperature may be decreased so as to reduce any or all of the amount of cyclic ether by-product formation that occurs with polyols that do not have β-hydrogens, to reduce the loss of polyols due to alkene by-product formation, and to reduce loss of any polyol that is distilled off during reaction.

Reaction times may range from 2 to 48 hours. The reaction is carried out in a non-corrosable vessel with non-corrosable mixing devices, such as those made of glass, stainless steel or coated with polytetrafluoroethylene, preferably glass. The reaction may be carried out in a nitrogen atmosphere. Preferably, the reaction is carried out in a vacuum of ≦50 mm/Hg, preferably, ≦10 mm/Hg to remove water of reaction. A dry polyester product may be isolated in any known way, including any of spray drying, freeze drying, flashing or through devolatilization during polymerization, or combinations thereof.

To insure a suitable molecular weight, in one embodiment, the acid functional, phosphorus-containing polyester may be formed in two-steps comprising mixing and reacting phosphorus containing acid, polyacid and excess polyol to form a hydroxyl functional polyester resin containing phosphate ester linkages; next, the hydroxyl functional polyester is endcapped with one or more polyacid to make an acid functional, phosphorus-containing polyester. Alternatively, a hydroxyl functional polyester is formed by reacting an excess of polyol with polyacid. Next, phosphorus containing acid is added and, optionally, the reaction temperature is increased, to form a hydroxyl functional polyester resin containing phosphate ester linkages. Finally, the thus formed polyester is endcapped with polyacid to make the acid functional, phosphorus-containing polyester.

Endcapping any hydroxyl functional polyester comprises adding excess polyacid is thereto and reacting the mixture thus formed, optionally, simultaneously with increasing the temperature of the reaction mixture above that temperature used to form the hydroxyl functional polyester. Endcapping increases acid number, decreases hydroxyl number, may reduce discoloration and leads to improved physical properties and weatherability. A hydroxyl functional polyester can be successfully endcapped with many different polyacids. For example, any hydroxyl functional polyester may be capped with a multifunctional carboxylic acid, such as trimellitic acid or its anhydride, to increase product crosslinking density. In general, the lower the pKa of the acid functionality, the better. Preferably, polyacids for endcapping comprise any having a pKa below that of the free carboxylic acid groups on the polyester to be endcapped, such as can be determined by titration. Examples of preferred capping polyacids may be chosen from isophthalic acid, phthalic anhydride, trimellitic anhydride, maleic anhydride, terephthalic acid and succinic anhydride.

In one embodiment of the present invention, the acid functional, phosphorus-containing polyester may be slightly branched to increase coating crosslink density and improve coating cure and physical properties. Branching may be conferred to the polyester by mixing and reacting in any tri- and higher functional polyol, such as trimethylolpropane (TMP), so that it is reacted into the polymer before all of the polyacid is reacted into the polymer, e.g. prior to adding diols or in a stage or shot during the formation of a hydroxyl functional polyester.

One or more esterification catalysts, such as trialkyl tin compounds may be added in amounts from 0.05 to 1.5 wt. %, based on the total weight of the reaction mixture. Because suitable phosphorous containing acids can also catalyze the esterification reaction, esterification catalysts are not necessary. Examples of suitable catalysts may include dibutyl tin oxide, tin chloride, butyl chlorotin dihydroxide or tetrabutyloxytitanate.

To prevent discoloration, the reaction may be carried out in the presence of from 0.05 to 1.0 wt. %, preferably 0.1 to 0.3 wt. %, all percentages based on the total weight of the reaction mixture, of an antioxidant, such as a phosphite, for example, triphenyl phosphite.

The powder composition of the present invention comprises a binder component, and may further comprise one or more curing agent to enhance crosslinking density and physical properties. The binder component may comprise any resin or (co)polymer having a $T_g$ of 30° C. or more, or 35° C. or more, preferably 45° C. or more, and up to 100° C., or up to 80° C., preferably up to 70° C., such as one or more acid functional, phosphorous-containing polyester. Alternatively, the binder component does not comprise acid functional, phosphorous-containing polyester and the composition comprises, as an additive, one or more acid functional, phosphorous-containing polyester to improve corrosion resistance, adhesion to substrates and/or pigment wetting. Accordingly, the acid functional, phosphorus-containing polyester of the present invention may comprise up to 100 phr, i.e. all of the binder plus curing agent, or up to 98 phr, or up to 50 phr of the compositions. Where the one or more acid functional, phosphorus-containing polyester is blended with one or more other binder or is used as an additive to one or more other binder, it may comprise 0.1 phr or more, or 5 phr or more of the powder composition.

Suitable binder components may be one or more resin or (co)polymer chosen from acid functional, phosphorus-containing polyester, polyester, epoxy, acrylic, poly(glycidyl (meth)acrylate) (GMA), urethane, silicone, mixtures and hybrids thereof. Preferred binders may comprise one or more acid functional, phosphorus-containing polyester, polyester, or epoxy-polyester hybrid. In an epoxy-polyester hybrid, the epoxy and polyester react with each other to cure.

Suitable polyester binders may include one or more than one amorphous carboxylic acid functional or hydroxyl functional polyester resin. Suitable polyester resins may be linear or branched, and formed by the polymerization of polyols and polyacids. Carboxylic acid functional polyesters may comprise the reaction product of one or more polyol with an excess of one or more aliphatic or alicyclic polyacid. The $T_g$ of a polyester may be increased by including aromatic polycarboxylic acids and their anhydrides. Suitable polyester resin chains may be relatively short, such that acid functional polyesters should have acid numbers from 15 to 100, for example from 25 to 90. Suitable polyester resins having hydroxyl functional groups may have hydroxyl numbers of from 0 to 20, for example, 12 or less, or 10 or less.

In a preferred embodiment, one or more polyester is weatherable. Suitable weatherable polyesters may comprise, for example, the reaction product of from 15 to 90 mole % of IPA, from 5 to 30 mole %, for example from 15 to 30 mole %, of 1,4-cyclohexanedicarboxylic acid, with the remainder of acid, for example, 65 mole % or less, of terephthalic acid, based upon the total number of moles of acid present, and from 50 to 100 mole %, such as 70 to 100 mole %, of branched polyols having from 5 to 11 carbon atoms, such as NPG, based upon the total number of moles of polyols present, wherein at least 8 mole % of all reactants have a functionality of three or higher, such as trimethylolpropane, based upon the total number of moles of both acid and polyol present.

Suitable epoxy resin binders include polyepoxides, condensed glycidyl ethers of (oligo)bisphenols, made by reacting bisphenol with halohydrins, polyglycidyl ethers and esters. Preferably, the epoxy resins consist of particles of one or more glycidyl ethers of (oligo)bisphenol A or F having a melt viscosity at 150° C. of from 100 to 3500 centipoises (cps), preferably 200 to 2000 cps.

Acrylic resins may comprise carboxyl, isocyanate, amine, glycidyl, or hydroxyl functional acrylic copolymers of $C_1$ to $C_{18}$ alkyl(meth)acrylates, such as, for example, the copolymerization product of one or more $C_1$ to $C_{18}$ alkyl (meth)acrylate with, respectively, from 1 to 10 wt. %, based on the weight of all comonomers, of (meth)acrylic acid, isocyanate alkyl(meth)acrylates, aminoalkyl(meth)acrylates, glycidyl (meth)acrylate (GMA), or hydroxy alkyl (meth)acrylates, and copolymers of, e.g. with alkyl(meth)acrylates. Further, suitable acrylic resins may comprise GMA homopolymers, and acrylate terminated urethane, polyester and epoxy oligomers and polymers.

Suitable silicone resins may comprise any linear or branched silicone resin having a viscosity of from 500 and 10,000 cps at 150° C., for example 1000 to 5000 cps, and having reactive organic substituents, such as, for example, $C_2$ through $C_{24}$ alkyl or (alkyl)aryl monovalent hydrocarbons, curable alkoxy, (alkyl)aryloxy, hydroxyl or silanol groups. Useful silicone resins may have a degree of organic substitution of 1.5 or less, suitably from 1 to 1.5 to provide heat stable coatings. Preferably, silicone resins have a condensable silanol functionality (Si—OH) or a hydroxyl functionality, wherein the silanol or hydroxyl content ranges from 1.5 to 7 wt. %, for example from 2 to 5 wt. %. Preferred monovalent hydrocarbons include phenyl, methyl, and mixtures thereof. As used herein the term "degree of organic substitution" means the average number of substituent organic groups per silicon atom and is given by the summation of the mole percent of each reactive ingredient used to form the silicone multiplied by the number of substituents per silicon atom contained in each ingredient.

Curing agents may comprise one or more epoxy resins, hydroxyalkylamides and carboxylic-functional group containing compounds.

Suitable epoxy curing agents may comprise epoxy adducts of polyamines, such as bisphenol A epoxy adduct of an aliphatic, alicyclic or aromatic diamine, bisphenol A epoxy adducts of imidazoles, such as bisphenol A epoxy phenyl imidazole, triglycidyl isocyanurate (TGIC), blends of tris (oxiranylmethyl)benzene-1,2,4-tricarboxylate with bis(2,3-epoxypropyl)terephthalate and epoxy novolaks.

Suitable hydroxyalkylamide (HAA) curing agents may comprise β-hydroxyalkylamides, such as, for example, N,N, N',N'-tetrakis(2-hydroxyethyl)hexanediamide, N,N,N',N'- tetrakis(2-hydroxypropyl)hexanediamide, di(β-hydroxyethyl) propylamide and di(β-hydroxyalkyl) $C_8$ to $C_{40}$ alkylamides.

Suitable amounts of the one or more curing agent are any sufficient to effect curing, such as, for example, 1 phr or more, or 2 phr or more, or 10 phr or more, and up to 50 phr, or up to 20 phr, or, preferably, up to 15 phr, depending upon the particular chemistry and stoichiometry involved. HAA curing agents may preferably be used in amounts of up to 15 phr, or up to 7 phr and in amounts of 2 phr or more or 3 phr or more. In general, the one or more polymer or resin may be mixed with one or more curing agent such that the total stoichiometric ratio of one or more curing agent to each polymer or resin ranges from 0.66:1.0 to 1.5:1.0.

In one embodiment, the smoothness of coatings, capstocks or films may be improved by including in the compositions up to 20 phr, for example, up to 10 phr, of one or more carboxylic-functional group containing compound chosen from an at least partially crystalline polyester resin curing agent having an acid number of from 20 to 60 mg KOH/g polyester and an hydroxyl number of 11 or less mg KOH/g polyester, and a crystalline polycarboxylic acid or polyanhydride curing agent having up to 4 carboxylic acid functionalities and having an acid number between 150 and 400 mg KOH/g polyester, e.g. sebacic acid, dodecanedioic acid, adipic acid or the anhydrides thereof. Suitable crystalline polyesters or polyanhydrides of carboxylic acids that have carboxylic acid functionalities of 2 or higher. Such crystalline polyesters or polyanhydrides can include, for example, ADDITOL™ P 791 solid aliphatic polyanhydride (Cytec Surface Specialties Inc., Smyrna, Ga.). As used herein, the term "crystalline polyesters" are those which exhibit a single sharp melting point in the range of 60-150° C., as measured by DSC. Crystallinity may be increased by the selection of a homogeneous monomer mix, such as, for example, a single diol and a single dicarboxylic acid, as well as by the use of aliphatic monomers, such as a mixture of 1,6-hexanediol and adipic acid.

The powder compositions of the present invention may comprise additional ingredients, such as, for example, pigments or colorants, fillers, metallic flake pigments, matting agents, melt flow aids, leveling agents or degassing additives, light stabilizers, anti-corrosives, mold release agents and antioxidants.

One or more of each of pigments or colorants, e.g. titanium dioxide, carbon black, organic phthalocyanines, hollow sphere pigments or opaque polymers; and fillers, such as china clay, barytes, and large size fillers may be used in amounts of from 10 to 120 phr. Large size fillers, e.g. those having an average particle size of over 25 μm, such as diatomaceous earth, wollastonite or calcium carbonate, can be added to create a matte finish coating or a capstock.

In another embodiment, the powder compositions of the present invention comprise metallic flakes or effect pigments bonded or adhered to the polymer or resin to provide corrosion resistant, metal-look coatings and films. Suitable metallic flakes may comprise aluminum flakes, i.e. aluminum bronze, including the thin "leafing" variety or thicker non-leafing variety. Other suitable metal flakes include, for example, nickel, bronze, zinc, stainless steel, copper, brass, alloys and mixtures thereof. Suitable effect pigments include, for example, metal oxide coated micas and interference pigments, for example, CHROMAFLAIR™ light interference pigments, from Flex Products, Inc., Santa Rosa, Calif. The amount of the one or more metallic flake or effect pigments should range up to 20 phr or less, or 13.33 phr or less to limit the explosivity hazard of coating powders containing such materials, while such flake materials may be used in amounts of 0.05 phr or more, or 0.2 phr or more, or 1 phr or more.

To create a matte finish or appearance, powders may comprise waxes, PTFE, organophilic clays, and acid-functional acrylate (co)polymers in the amount of from 1 phr or more, or 2 phr or more, and up to 50 phr, or up to 20 phr, or up to 10 phr.

Melt flow aids, such as alkyl(meth)acrylate copolymers, and silicones, and mold-release agents may comprise 0.1 phr or more, or 0.5 phr or more, or 1 phr or more, and up to 4 phr, or up to 2.5 phr, or up to 1.5 phr in the powders of the present invention.

Leveling agents, e.g. benzoin (2-Hydroxy-1,2-diphenylethanone) and alkyl ethers and esters of benzoin, and light stabilizers, e.g. hindered amines and hindered phenols, may comprise from 0.3 to 4 phr in the powder compositions of the present invention. In addition, anticorrosives such as zinc phosphate and other metal phosphates may comprise amounts ranging up to 10 phr, for example, from 0.01 to 5 phr of the powder compositions of the present invention. Antioxidants, such as benzotriazole, may comprise amounts of from 0.1 to 1 phr of the powder compositions of the present invention.

Dry flow aids, such as fumed silica and alumina, and fumed silica treated with alkoxysilanes, may be added to coating powders in amounts of from 0.1 phr or more, or 0.5 phr or more, and up to 1.5 phr, or up to 1.0 phr.

Powder compositions of the present invention comprise a distribution of particles having an average particle size of from 5 to 120 μm, for example, 60 μm or less. Preferably, the powders of the present invention have an average particle size of 10 μm or more, or 15 μm or more, can have an average particle size of 35 μm or less, or, more preferably 25 μm or less. Powder compositions may be formed in any known manner such as, for example, by combining the one or more binder, and any additives except dry flow aids into an extruder or a melt mixer, following by drying, crushing and grinding to a desired particle size. Alternatively, an aqueous or solvent dispersion or suspension comprising binder and any additives except dry flow aids can be formed and spray dried. Dry flow aids should be post-blended into the product powder after it is formed, such as, for example, by simple mixing.

The powder compositions may be applied to substrates in any known manner, such as, for example, by electrostatic or triboelectric spray or fluidized bed coating. Alternatively, the powders can be formed into films by extrusion, in-mold coating or on-mold coating techniques, or by compressing the powders either underneath a heated membrane or platen and onto a substrate, or between heated membranes, platens or substrates.

The compositions of the present invention provide coatings for many substrates, including substrates to which known coatings have a problem adhering. The powder compositions of the present invention may be applied to any metal, plastic, rubber, glass or wooden substrate, such as, for example, steel, tin plated steel, galvanized metal, aluminum, iron, brass, and steel or aluminum that have not been pre-treated and/or which have not been cleaned, debrided or degreased. Examples of suitable substrates may include, for example, agricultural and construction equipment and parts thereof, aluminum window frames, aluminum siding, machinery, pipes, small motors, steel springs, steel coils, cans, bottles, and automotive parts;

sheet molded composites, laminated articles, molded articles, textiles, fibers, woven webs, outdoor furniture and sporting goods.

EXAMPLES

Example 1

Synthesis of an Acid Functional, Phosphorus-Containing Polyester

To a 2-Liter glass reaction kettle fitted with a glass-jacketed thermocouple probe, glass stir-rod and paddle, nitrogen purge, and ceramic bead packed reflux column was added neopentyl glycol (NPG) (781.13 g, 7.50 mol), tin catalyst (Di-n-butyltin oxide) Fascat™ 4201 (1.59 g) from Arkema Inc. (Philadelphia, Pa.), and triphenyl phosphite (1.19 g). The kettle was purged with nitrogen gas at 2 mL/min., and then the contents of the kettle were heated to 140° C. to melt the NPG. Isophthalic acid (IPA) (996.80 g, 6.00 mol) was added, with stirring, in two equal portions over 10 minutes. Upon complete addition of IPA to the kettle, 85+% orthophosphoric acid (41.2 mL) was added dropwise, with stirring, at 140° C. over a 10 minute period. The kettle contents were heated from 180° C. to 240° C. at ambient pressure over a 12 hour period to remove water and any other by-products from the reaction mixture. The reaction was cooled to 220° C., and then contents of the kettle were discharged onto a non-stick pan and allowed to cool to ambient temperature and solidify. The resulting phosphate polyester resin had a $T_g$ of 56° C. The acid number of the polyester resin was determined to be 29 by base titration and the melt viscosity was found to be 8.25 Poise at 200° C. using an ICI Cone & Plate viscometer calibrated per the manufacturer's specifications.

Example 2

Synthesis of an Acid Functional, Phosphorus-Containing Polyester

To a 2-Liter glass reaction kettle fitted with a glass-jacketed thermocouple probe, glass stir-rod and paddle, nitrogen purge, and ceramic bead packed reflux column was added NPG (781.13 g, 7.50 mol), tin catalyst Fascat™ 4201 (1.74 g), and triphenyl phosphite (1.31 g). The kettle was purged with nitrogen gas at 2 mL/min., and then the contents of the kettle were heated to 150° C. to melt the NPG. Terephthalic acid (TA) (996.80 g, 6.00 mol) was added, with stirring, in two equal portions over 15 minutes and then the reaction mixture was heated from 150° C. to 240° C. for 16 hours to give a hydroxyl functional resin having an acid number of 5 (by base titration) and a hydroxyl number of 124 (by titration with phenolphthalein). The reaction temperature was reduced to 140° C. and then 85+% orthophosphoric acid (41.2 mL) was added dropwise, with stirring, over a 15 minute period. The kettle contents were heated from 140° C. to 220° C. at ambient pressure for three hours, then the reaction temperature was reduced to 180° C. and IPA (200.00 g, 1.20 mol) was added, with stirring. The reaction mixture was then heated from 180° C. to 230° C. for 3 hours to remove water and any other by-products, followed by cooling to 150° C. and discharging the contents of the kettle onto a non-stick pan, allowing them to cool to ambient temperature and solidify. The resulting phosphate polyester resin had a $T_g$ of 62° C. The resulting phosphorus-containing polyester resin had an acid number of 75 (by base titration) and a melt viscosity of 6.25 Poise at 200° C. measured with an ICI Cone & Plate viscometer calibrated per the manufacturer's specifications.

Example 3

Synthesis of an Acid Functional, Phosphorus-Containing Polyester

To a 2-Liter glass reaction kettle fitted with a glass-jacketed thermocouple probe, glass stir-rod and paddle, nitrogen purge, and ceramic bead packed reflux column was added NPG (585.84 g, 5.62 mol). The kettle was purged with nitrogen gas at 2 mL/min., and then the contents of the kettle were heated to 150° C. to melt the NPG. With stirring, Tin catalyst, Fascat® 4201 (1.56 g), triphenyl phosphite (1.20 g), 85+% orthophosphoric acid (10.3 mL), and TA (830.67 g, 5.00 mol) were added. The reaction was heated from 150° C. to 240° C. for 16 hours at ambient pressure followed by continued heating at a reduced pressure (23 mm/Hg) for 10 minutes to remove remaining traces of water from the reactor. To counteract the loss of NPG monomer from the reaction when forms the cyclic ether, 3,3-dimethyloxetane (b.p.=81° C. @ 765 mm Hg, d=0.835 g/mL), at approximately 190° C. and above, due to phosphoric acid catalyzed dehydration of the NPG, and to maintain the desired reaction stoichiometry, an additional 60 grams of NPG was added to the reaction mixture, followed by heated for 4 hours at 220° C. and adding IPA (145.37 g, 0.88 mol), with stirring. The reaction was allowed to continue at ambient pressure for 8 hours at 180-220° C. The resulting product was discharged onto a non-stick pan and allowed to cool to ambient temperature and solidify. The resulting phosphorus-containing polyester resin had an acid number of 37 by base titration and a melt viscosity of 35.75 Poise at 200° C. using an ICI Cone & Plate viscometer calibrated per the manufacturer's specifications.

Examples 4-9

Coating Formulation and Performance (Examples 4, 6 and 8 are Comparative Examples)

In each of the following examples, the performance of a powder and a powder coating made therefrom was evaluated, as follows:

Film Thickness: Dry film thickness was measured using a POSITECTOR™ Model 6000-FN1 Coating Thickness Gauge from DeFelsko Corporation, Ogdensburg, N.Y., the film thickness on ferrous substrates measured according ASTM D 1186-01 TEST METHOD B—ELECTRONIC GAUGES "Standard Test Methods for Nondestructive Measurement of Dry Film Thickness of Nonmagnetic Coatings Applied to a Ferrous Base", 2001 and the film thickness on nonferrous substrates measured according ASTM D 1400-00"Standard Test Method for Nondestructive Measurement of Dry Film Thickness of Nonconductive Coatings Applied to a Nonferrous Metal Base", 2000. Film thickness is reported as the range (low to high) of three readings measured in the center portion of the panel.

204° C. Gel Time: A $\frac{1}{8}^{th}$ teaspoon of coating powder to be tested is dropped onto a hot-plate with simultaneous starting of a timer. The sample is stirred with the tip of a wooden stirrer with sufficient motion to mix and melt the sample over an area one inch in diameter. Stirring is continued with periodic lifting of the stirrer about two inches from the hot-plate. When the material no longer produces a continuous strand from the hot-plate to the stirrer when the stirrer is lifted, the material is considered gelled. Gel time indicates how fast a powder formulation will cure at a specified temperature. Acceptable gel times are those shorter than the would-be in use cure time at the tested temperature.

191° C. HPMF (mm): Each 0.75 g sample of coating powder was pressed in a pellet press to the dimensions of 12.7 mm diameter by 6 mm thickness. A hot-plate at a constant temperature is set at a 35° angle. The pressed pellet is placed at the top of the hot-plate and allowed to soften and flow down the plate due to the influence of gravity. Generally, the further the pellet flows, the smoother the resulting coating. For customers preferring smooth coatings, HPMF values of greater than or equal to 60 millimeters is usually considered acceptable.

20° Gloss and 60° Gloss: The gloss of a cured coating was measured using a BYK-Gardner micro-TRI-gloss meter (Byk-Gardner USA, 9104 Guilford Road, Columbia, Md. 21406 USA) according to ASTM D 523-89 "Standard Test Method for Specular Gloss" (Reapproved 1999). Gloss readings are reported as the average of three readings near the center of the specimen and are recorded at both the 20° geometry and the 60° geometry. A 60° gloss reading may be interpreted as follows: 0-10: Very low gloss—textured finish or smooth matte finish; 10-30: Low gloss; 30-70: Mid gloss; 70+ High gloss. The 20° geometry is used for comparing specimens having 60° gloss values higher than 70.

Impact, direct and reverse: Direct and reverse impact resistance was measured according to ASTM D 2794-93 "Standard Test Method for Resistance of Organic Coatings to the Effects of Rapid Deformation (Impact)" (Reapproved 2004). This test measures the maximum force (dropping a 1.81 kg (four-pound) impacting weight onto a 12.7 mm diameter (⅝ inch) indenter to generate impact) withstood by the test coating panel without the appearance of cracking, the cracking inspection being done without magnification. Testing with the coated side up gives direct impact; coated side down gives reverse impact. A BYK-Gardner Impact Tester Model G1120 from BYK-Gardner USA, Columbia, Md., was used to obtain impact resistance measurements.

PCI Smoothness: Coating smoothness was determined visually by comparing the orange-peel (surface roughness) of the exemplified coatings to a set of coating smoothness standards, which are graded on a scale from 1-10 with 1 being the roughest surface and 10 being the smoothest. The coating smoothness standards are supplied by the Powder Coating Institute (PCI), Alexandria, Va.

Mandrel Bend: Coating flexibility (resistance to cracking) was determined according to ASTM D 522-93a TEST METHOD B—CYLINDRICAL MANDREL TEST "Standard Test Methods for Mandrel Bend of Attached Organic Coatings" (Reapproved 2001), using a BYK-Gardner Cylindrical Mandrel Set Model MG-1412 from BYK-Gardner USA, Columbia, Md.

Powder Storage Stability Testing: The storage stability of the thermosetting coating powders, and the smoothness of coatings resulting therefrom, was determined by measuring the Hot Plate Melt Flow (HPMF) and Gel Time of containers of each coating powder (~100 g) after it is stored in a convection oven maintained at 43.3° C. (110° F.) for a given period of time. Small samples of the powder coating compositions are removed from the oven and tested for retention of properties as compared to the freshly prepared powder coating compositions.

Methyl Ethyl Ketone (MEK): Determines the degree of cure of a thermoset powder material when cured. A cotton-tipped applicator is saturated with MEK and rubbed a total of 50 double rubs back and forth across the surface of a test coating using approximately 2.6 cm strokes and 2-2.5 Kg of application pressure. One back and forth motion equals one double rub. The applicator shall remain saturated with MEK throughout the 50 double rubs. Coatings that display MEK resistance ratings from 4-5 are considered to have acceptable cure, physical properties and solvent resistance for most applications. The test panels are rated in Table 1, as follows:

TABLE 1

| MEK Resistance Rating | Rub-Off | Degree of Cure or Indication of Chemical Resistance | Comments |
|---|---|---|---|
| 5 | None | Excellent | No rub-off of coating pigmentation. No softening or dulling of coating surface. |
| 4 | Slight | Very Good | Slight rub-off of coating or pigmentation. |
| 3 | Moderate | Fair to Good | Moderate rub-off of coating or pigmentation |
| 2 | Heavy | Poor to Fair | Heavy rub-off of coating or pigmentation |
| 1 | Extreme | Very Poor to None | Extreme rub-off of coating or pigmentation, or complete rub through coating to substrate. |

Salt Spray Aluminum: Salt spray corrosion testing of coatings applied to a 76.2 mm×152.4 mm×0.60 mm (3 in.×6 in.×0.25 in.) bare aluminum Type A Q-Panels from Q-Lab Corporation, Cleveland, Ohio, was conducted according to ASTM B 117-03 "Standard Practice for Operating Salt Spray (Fog) Apparatus" (2003), by cutting an X-scribe (approximately 75 mm long by 40 mm wide at the perimeter) through the coating down to the metal substrate using a sharp metal blade and testing. A coated panel is considered to have failed salt spray corrosion testing when the coating has disbonded (creeped) from the substrate a distance of 0.80 mm from the initial scribe. The more time that passes before a sample fails salt spray testing, the better the corrosion resistance/protection of the coating/substrate system.

Salt Spray Steel B-1000: Salt spray corrosion testing of coatings applied to 76.2 mm×152.4 mm×0.66 mm (3 in.×6 in.×0.26 in.) polished B1000 P60 DIW ACT iron phosphate treated, chrome sealed, deionized water rinsed Cold Rolled Steel panels, then a and from ACT Laboratories, Inc., Hillsdale, Mich., was conducted according to the practices of ASTM B 117-03 "Standard Practice for Operating Salt Spray (Fog) Apparatus" (2003), by cutting an X-scribe (approximately 75 mm long by 40 mm wide at the perimeter) through the coating down to the metal substrate using a sharp metal blade. A coated panel is considered to have failed salt spray corrosion testing when the coating has disbonded (creeped) from the substrate a distance of 0.80 mm from the initial scribe. The more time that passes before a sample fails salt spray testing, the better the corrosion resistance/protection of the coating/substrate system.

The coating powders listed in Table 2 were formulated by simple melt mixing of the ingredients in a 30 mm Baker Perkins twin screw extruder (Baker Perkins Inc., Grand Rapids, Mich.) at 400 RPM, 50% torque and a 93° C. barrel temperature setting. The resulting molten extruded mixture was fed through cooled chill-rolls to form a solid sheet that was subsequently granulated into chip form. Post blend (dry flow) additives, including, Aeroxide™ Alu C, were mixed with the chips by shaking together in a plastic bag for 10 seconds. The post blend treated chips were then ground to a fine powder in a Retsch ZM 1000 Ultracentrifugal Mill (Retsch, Inc., Newtown, Pa.) at 15,000 RPM using a 1.0 mm screen. The resulting ground powder was screened through a 105 μm sieve for subsequent application to form coatings.

TABLE 2

Coating Powder Formulations

| | EXAMPLE | | | |
|---|---|---|---|---|
| | 4 (Comparison) | 5 | 6 (Comparison) | 7 |
| Saturated Carboxylated Polyester Resin Crylcoat ™ 2441-2[1] (Acid Number of 33) | 93 | ///// | ///// | ///// |
| Saturated Carboxylated Polyester Resin P-865[7] (Acid Number of 33-37) | ///// | ///// | 95 | 75 |
| Acrylic polymer/Silica Mix Resiflow ™ P67[2] | 1.4 | 1.4 | 1.4 | 1.4 |
| 2-Hydroxy-1,2-diphenylethanone leveling agent Benzoin[8] | 0.8 | 0.8 | 0.8 | 0.8 |
| Titanium Dioxide Tioxide TR 93[6] | 50 | 50 | 50 | 50 |
| 1,3,5-Triglycidyl isocyanurate curing agent Araldite ™ PT-810[5] | 7 | 8.5 | ///// | ///// |
| N,N,N',N'-Tetrakis(2-hydroxyethyl) hexanediamide curing agent Primid ™ XL-552[3] | ///// | ///// | 5 | 5 |
| Polyester of Example 2 (Acid Number of 75) | ///// | 46 | ///// | ///// |
| Polyester of Example 1 (Acid Number of 29) | ///// | ///// | ///// | 20 |
| Saturated Carboxylated Polyester Resin Crylcoat 2409[1] (Acid Number of 33) | ///// | 46 | ///// | ///// |
| Fumed Aluminum Oxide Aeroxide ™ Alu C[4] | 0.20% | 0.20% | 0.20% | 0.20% |

[1]Cytec Surface Specialties, Inc., Smyrna, GA.
[2]Estron Chemical, Inc., Calvert City, KY.
[3]EMS Chemie, Domat, Switzerland.
[4]Degussa AG, Duesseldorf, DE.
[5]Huntsman Advanced Materials Americas Inc., Brewster, NY.
[6]Huntsman Tioxide, Downers Grove, IL.
[7]DSM Coating Resins, Zwolle, The Netherlands.
[8]GCA Chemical Corporation, Bradenton, FL.

Each of the coating powders shown in Table 2 was applied to 76.2 mm×152.4 mm×0.60 mm (3 in.×6 in.×0.25 in.) bare aluminum Type A Q-Panels and 76.2 mm×152.4 mm×0.66 mm (3 in.×6 in.×0.26 in.) polished B1000 P60 DIW ACT Cold Rolled Steel panels with a Nordson Versa Spray II electrostatic powder spray gun, gun tip voltage setting: 60 kV (Nordson Corporation, Westlake, Ohio). The coated panels were cured in a Blue M Model DC-20G2 electric hot air circulation oven (Lindberg/Blue M, Asheville, N.C.) for 15 minutes at 204° C. The resulting coatings exhibited physical properties, as follows:

TABLE 3

Powder Coating Test Results

| | EXAMPLE | | | |
|---|---|---|---|---|
| | 4 | 5 | 6 | 7 |
| Film Thickness (μm) | 50.8-63.5 | 50.8-63.5 | 50.8-63.5 | 50.8-63.5 |
| 204° C. Gel Time (sec) | 170 | 240 | 57 | 50 |
| 191° C. HPMF (mm) | 124 | NM[1] | 43 | 63 |
| 20° Gloss | 86 | 43 | 80 | 75 |
| 60° Gloss | 96 | 86 | 96 | 96 |
| Impact, direct kg-m (in-lb) | 1.84 (160) | 0.46 (40) | 1.84 (160) | 0.23 (20) |
| Impact, reverse kg-m (in-lb) | 1.84 (160) | 0.23 (20) | 1.84 (160) | 0 (0) |
| PCI Smoothness | 7 | 6 | 6 | 6 |
| Mandrel bend | pass | fail | pass | pass |
| MEK (50 Rubs) | 4 | 3 | 5 | 4 |

TABLE 3-continued

Powder Coating Test Results

| | EXAMPLE | | | |
|---|---|---|---|---|
| | 4 | 5 | 6 | 7 |
| Corrosion resistance | | | | |
| Salt Spray Aluminum (1/32") (0.80 mm) | 1344 hrs | 3192 hrs | 3192 hrs | >3360 hrs |
| Salt Spray Steel B-1000 P-60 (1/32") (0.80 mm) | 672 hrs | 672 hrs | 672 hrs | 1512 hrs |

[1]Not measured.

The coatings of Examples 5 and 7 exhibit outstanding corrosion resistance, especially in powders formulated with binders comprising an acid functional, phosphorous-containing polyester having an acid number of 29.

TABLE 4

Coating Powder Formulations

| | EXAMPLE | |
|---|---|---|
| | 8 (comparison) | 9 |
| Crylcoat ™ 2441-2 (Acid Number of 33) | 95 | ///// |
| Polyester of Example 3 (Acid Number of 37) | ///// | 95 |
| Resiflow ™ P67 | 1.4 | 1.4 |

TABLE 4-continued

Coating Powder Formulations

| | EXAMPLE | |
|---|---|---|
| | 8 (comparison) | 9 |
| Benzoin | 0.8 | 0.8 |
| Tioxide TR 93 Titanium Dioxide | 50 | 50 |
| Primid ™ XL-552 Curing Agent | 5 | 5 |
| Fumed Silica CAB-O-SIL M5 (Cabot Corporation, Tuscola, IL) | 0.10% | 0.10% |

The coating powders shown in Table 4 were applied to 3 in.×6 in.×0.26 in. (76.2 mm×152.4 mm×0.66 mm) polished B1000 P60 DIW ACT Cold Rolled Steel panels using a Nordson Versa Spray II electrostatic powder spray gun with a gun tip voltage setting of 75 kV. The coated panels were cured in a Blue M Model DC-20G2 electric hot air circulation oven for 15 minutes at 191° C. The resulting coatings exhibited physical properties, as follows:

TABLE 5

Powder Coating Test Results

| | EXAMPLE | |
|---|---|---|
| | 8 | 9 |
| Film Thickness (μm) | 50.8-68.6 | 50.8-71.1 |
| 204° C. Gel Time (sec) | 55 | 54 |
| 191° C. HPMF (mm) | 63 | 68 |
| 20° Gloss | 77 | 76 |
| 60° Gloss | 84 | 92 |
| Impact, direct (in-lb) [kg-m] | (160) [1.84] | 140 [1.61] |
| Impact, reverse (in-lb) [kg-m] | (160) [1.84] | 140 [1.61] |
| PCI Smoothness | 7 | 6 |
| Mandrel bend | pass | pass |
| MEK (50 Rubs) | 4 | 4 |

TABLE 6

Powder Coating Test Results

| | EXAMPLE | | | |
|---|---|---|---|---|
| Days stored at 43.3° C. | 8 | 9 | 8 | 9 |
| | 204° C. Gel Time (sec) | | 191° C. HPMF (mm) | |
| 0 | 55 | 54 | 63 | 68 |
| 1 | 61 | 55 | 70 | 75 |
| 6 | 62 | 56 | 68 | 74 |
| 15 | 58 | 55 | 69 | 74 |
| 59 | 58 | 71 | 62 | 65 |

As shown in Table 6, the Gel Time of each of Example 9 and comparative Example 8 is very good, even after 59 days of storage. When storage stability is compared based on HPMF results, each of Example 9 and comparative Example 8 display excellent storage stability with After 59 days of storage at 43.3° C., with minimal melt flow losses. These results indicate that both freshly prepared coating powders and coating powders that have been stored for extended time periods will provide coatings having good smoothness and appearance properties.

We claim:

1. A powder composition comprising one or more acid or anhydride functional, phosphorus-containing polyester obtained by endcapping with a polyacid a hydroxyl functional phosphorus containing polyester, the carboxylic acid or anhydride functional, phosphorus-containing polyester chosen from an acid functional, phosphorus-containing aromatic polyester having an acid number of 15 or higher mg KOH/g polyester, an acid functional, phosphorus-containing aliphatic polyester having an acid number of 20 or higher mg KOH/g polyester, and mixtures and combinations thereof.

2. A powder composition as claimed in claim 1, further comprising one or more curing agent.

3. A powder composition as claimed in claim 2, wherein the said curing agents comprise one or more hydroxyalkylamide (HAA), bisphenol based epoxy resin or polyamine adduct thereof, triglycidyl isocyanurate (TGIC) or blends of tris(oxiranylmethyl)benzene-1,2,4-tricarboxylate with bis(2,3-epoxypropyl) terephthalate.

4. A powder composition as claimed in claim 1, further comprising a metallic flake pigment.

5. A powder composition as claimed in claim 1, further comprising one or more resin or (co)polymer chosen from polyester, epoxy, acrylic,—resin, acrylic (co)polymer—, poly(glycidyl(meth)acrylate),—polyurethane resin, polyurethane (co)polymer—, silicone, hybrids thereof, and mixtures thereof.

6. A powder composition as claimed in claim 1, wherein the said one or more carboxylic acid or anhydride funtional, phosphorus-containing polyester has an acid number up to 100 mg KOH/g polyester.

7. A coated substrate made from the powder composition as claimed in claim 1.

8. A coating as claimed in claim 7, wherein the said substrate is chosen from steel, aluminum, pretreated steel, and pretreated aluminum.

9. A powder composition as claimed in claim 1, wherein the carboxylic acid or anhydride functional, phosphorus-containing polyester comprises the reaction product of one or more polyacid, one or more phosphorus-containing acid or salt thereof, and one or more polyol that contains no β-hydrogen.

10. A method for making the powder composition as claimed in claim 1 comprising:
  mixing and reacting phosphorus containing acid, polyacid and excess polyol to form a hydroxyl functional polyester resin containing phosphate ester linkages,
  endcapping the hydroxyl functional polyester with one or more polyacid to make a carboxylic acid or anhydride functional, phosphorus-containing polyester, and
  isolating the carboxylic acid or anhydride functional, phosphorus-containing polyester in dry form.

11. A powder composition as claimed in claim 1, wherein the composition comprises a binder component having a glass transition temperature ($T_g$) of up to 100° C., and the binder comprises one or more carboxylic acid or anhydride functional, phosphorus-containing polyester.

* * * * *